April 14, 1953     B. R. BRINKLEY     2,634,952
DUST COLLECTOR FOR OVERHEAD DRILLING
Filed Feb. 15, 1952     2 SHEETS—SHEET 1
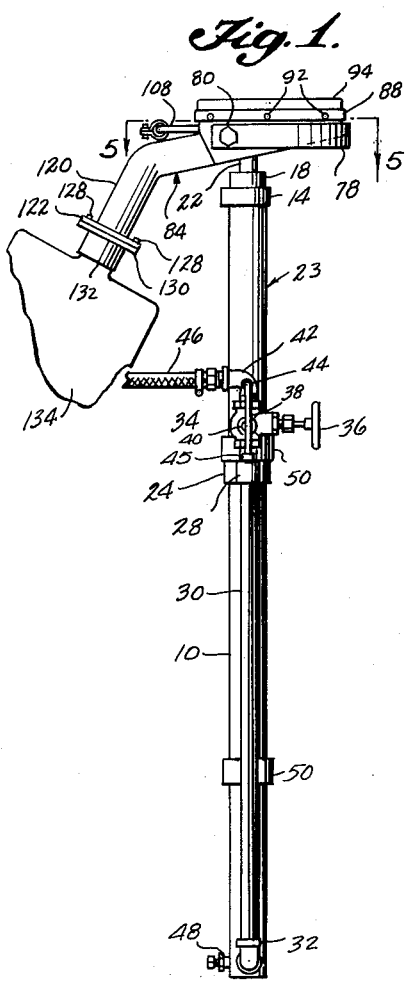
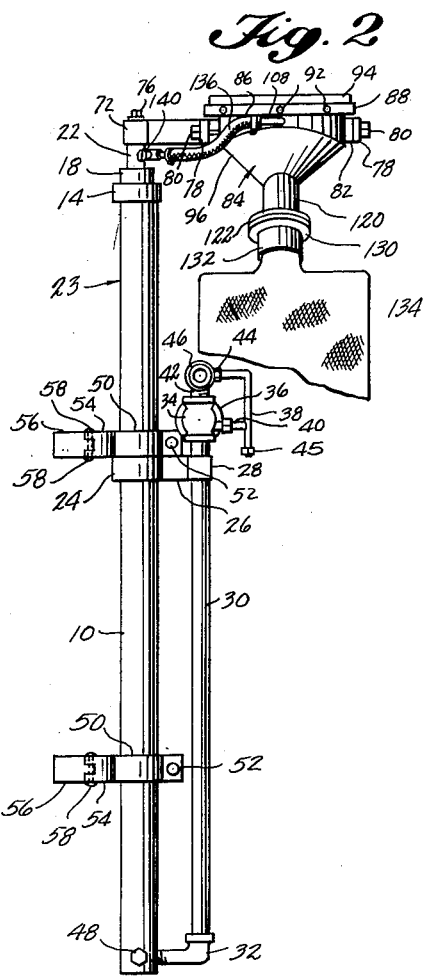
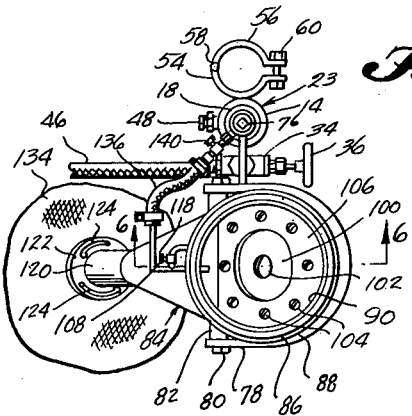
INVENTOR
BLAINE R. BRINKLEY,
BY
McMorrow, Berman & Davidson
ATTORNEYS

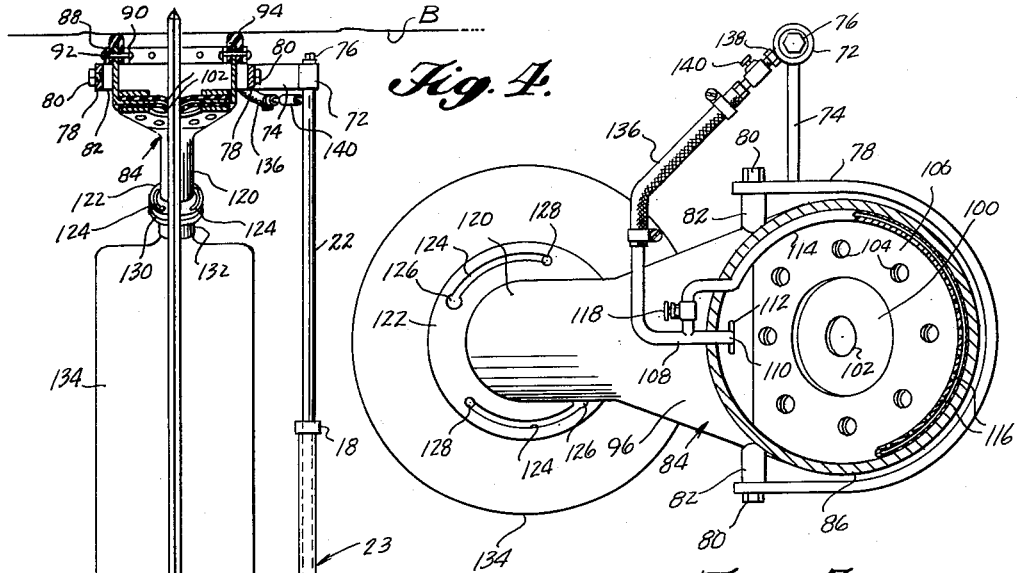
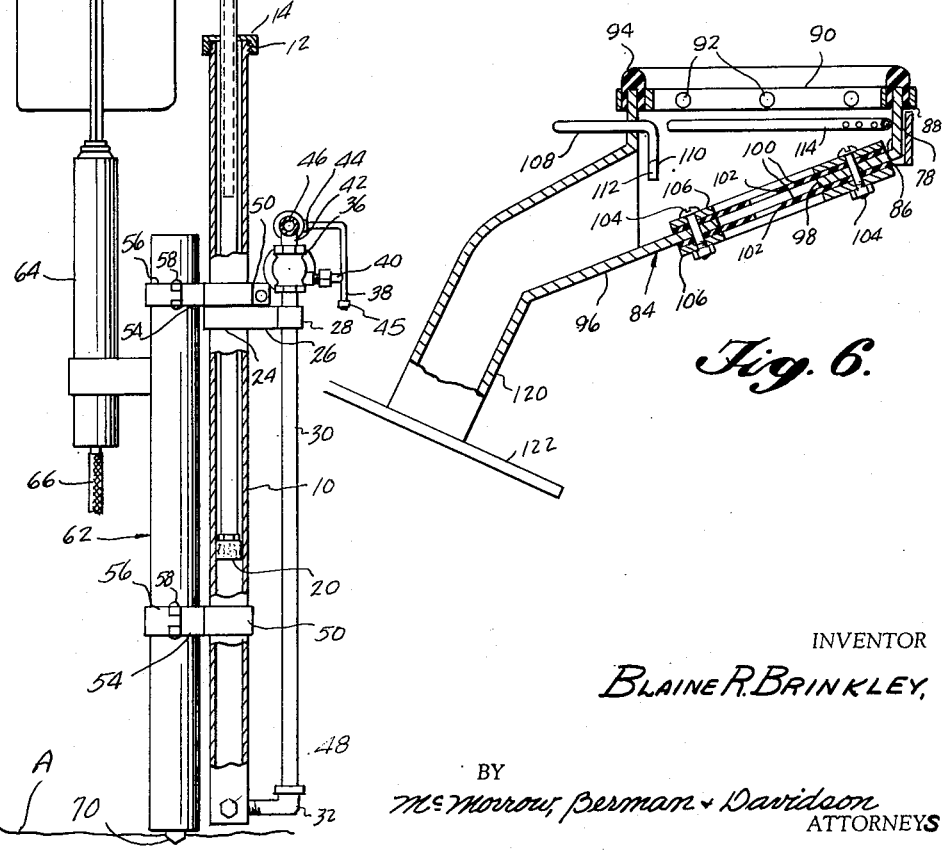

Patented Apr. 14, 1953

2,634,952

UNITED STATES PATENT OFFICE 2,634,952

DUST COLLECTOR FOR OVERHEAD DRILLING

Blaine R. Brinkley, Bluefield, Va.

Application February 15, 1952, Serial No. 271,696

2 Claims. (Cl. 255—50)

This invention relates to drilling apparatus such as is used in coal mines and similar locations. More particularly, the invention has reference to a dust collecting means particularly adapted for overhead drilling.

In drilling operations of the type referred to, overhead drilling is usually hampered to a considerable extent, by reason of the fact that substantial quantities of dust are released during the operation, and tend to form clouds that make visual observation of the drilling difficult. Additionally, the formation of clouds of dust in this manner represents an occupational hazard. This is so because the dust may be inhaled by the driller, to such an extent as will cause serious respiratory ailments to evidence themselves, if this particular occupation is followed regularly.

Heretofore, dust collecting heads have been devised, to be used in close proximity to a drilling bit. However, in many instances the heads must be embodied directly in the drill construction, with an attendant increase in the cost of the drill and with the further deficiency that the drill is in many instances incapable of use without its associated dust collecting means.

In still other constructions, the dust collecting device is adapted for use only with particular makes or types of drills, which restricts universal application of the dust collecting means.

In still other dust collecting means of which I have knowledge, preliminary adjustments must be made to retain the device in its desired position with relation to the drill bit and the rock or coal formation being drilled.

In view of the above, it is the object of the present invention to provide a dust collecting head for drills of the type stated, which will automatically extend itself to the proper length when the pneumatic drill is supplied with air under pressure, so as to be continuously forced against the surface of the rock or coal formation being acted upon.

It is another important object of the present invention to provide a dust collecting head so formed as to be capable of being clamped swiftly and easily to the drill, and removed from the drill with equal ease, thus to permit the drill to be used without the dust collecting head whenever desired.

Yet another important object is to provide a dust collecting head as stated so formed as to be extended to proper length by the same air as is supplied to the drill, the air that is used to extend the dust collecting head being channeled directly through the head to carry away the dust released by the drilling operation.

Still another important object is to provide a dust collecting head which is swively mounted in such a manner as to permit the head to be rotatably adjusted into proper alignment with the drill bit, so as to permit the location of the drill bit and collecting head to be changed as desired, the swiveled mounting of the dust collecting head being further adapted to permit the dust collecting head to be shifted clear of the drilling bit whenever desired, so as to permit the bit to be used without the head if necessary.

Yet another important object is to provide a dust collecting device as stated which will include by-pass means adapted to permit air to be fed under pressure to said head directly, without the necessity of its being first channeled through the extending means embodied in said device.

Other objects will appear from the following description, the claims appended thereto, and from the annexed drawing, in which like reference characters designate like parts throughout the several views, and wherein:

Figure 1 is a side elevational view of a dust collecting device formed in accordance with the present invention, a collecting bag embodied in said device being illustrated fragmentarily;

Figure 2 is an elevational view taken from the left of Figure 1;

Figure 3 is a top plan view;

Figure 4 is a view partly in side elevation and partly in longitudinal section showing the device as it appears when extended during use, a conventional drill being illustrated in operative association with said device;

Figure 5 is an enlarged sectional view through the head, taken substantially on line 5—5 of Figure 1; and Figure 6 is a sectional view through the head, on an enlarged scale, taken substantially on line 6—6 of Figure 3.

Referring to the drawings in detail, the dust collecting apparatus formed in accordance with the present invention includes an elongated tubular body 10 formed with a closed bottom end. The upper end of the bottom 10 is formed open, and has external threads 12 adapted to engage a complementarily threaded depending peripheral flange formed upon a centrally apertured cap 14.

The cap 14 serves as a closure for the upper end of the body 10, and slidable in the cap is a tubular piston 16 one end of which projects upwardly from the body 10 and is provided with a cap 18 which, like the cap 14, has a central aperture.

That end of the tubular piston 16 that is disposed within the body 10 is provided with a piston head 20 having wiping contact with the inner surface of the tubular body.

A tubular extension rod 22 slides in the cap 18, and projects upwardly from the tubular piston 16. As a result, if air is supplied to the lower end of the tubular body 10 under pressure, it will act to force the tubular piston 16 upwardly relative to the body 10. Further, continued movement of air under pressure into the body 10 serves to extend the tubular extension rod 22 upwardly relative to the piston 16.

The body 10, the tubular piston 16, and the extension rod 22 together constitute a support 23 of tubular formation from end to end, adapted to be extended as to its length by fluid under pressure.

Fixedly secured to the body 10, intermediate the opposite ends of the body, is a collar 24. Integral or otherwise rigid with said collar is a laterally extended arm 26 of short length, having on its outer end a ring 28 of small diameter.

A supply pipe 30 has its upper end extended through the ring 28, and has its lower end secured to an L 32 that communicates with the lower end of the body 10. The supply pipe 30 is thus supported fixedly to the body 10, in parallelism therewith, and is adapted to provide a means for supplying air or other fluid under pressure to the interior of the body.

Secured to the upper end of the supply pipe is a T 34, on which is mounted a main control valve 36.

A by-pass tube 38 (Figures 2 and 4) is provided, and has one end connected to the T 34 below the main control valve 36. The other end is connected to an L 42 mounted on the upper end of the T 34. The connection of the by-pass tube to the L 42 is effected by means of a fitting 44. The tube causes a small amount of air to by-pass the main valve when said valve is in closed position, for a reason to be made apparent.

The tube 38 has a depending extenson ordinarily capped, as at 39. By removal of the cap and attachment of a hose to said extension, air can be diverted for blowing purposes without being directed to a collecting head to be described hereinafter.

In this connection, the purpose of the by-pass tube is to cause a continuous stream of air to move through the dust collecting head, even where the main control valve 36 is closed. This would be desirable for the purpose of maintaining an air current within the collector head, which would prevent dust from escaping back through the head, when the collector was being moved from one place to another without removal of the dust bag.

For the purpose of supplying air under pressure to the support 23, I provide a hose 46 connected to the L 42, and leading from a suitable source of air under pressure, not shown.

At its lower end, the tubular body 10 is provided with a fitting 48, which is generally capped, said fitting being in the nature of a relief valve.

Means is provided upon the tubular support 23, for attachment thereto of a conventional drill. To this end, I provide split clamps 50, that are secured in adjusted positions upon the support 23 by means of clamping bolts 52. The clamps 50 can be adjusted upwardly or downwardly upon the support 23, as desired, and further, the spacing between said clamps can be varied as necessary. Additionally, the clamps can be rotatably adjusted upon the support 23. All of these adjustments may be made separately or in combination, for the purpose of accommodating drills of different sizes or lengths, and also for the purpose of permitting connection of the drill to the tubular support in selected positions of rotatable adjustment about said support.

The split clamps are integral with clamping ring sections 54, to which movable clamping ring sections 56 are hingedly connected by hinge pins 58. The ring sections 54 and 56 can be secured about a drill, and clamped to the drill by means of clamping bolts 60. The use of clamps of this type permits the drill to be mounted upon the support 23, or removed from said support, with considerable facility, so that the drill can be used either with or without the collecting device constituting the present invention. Further, the use of clamps of the type stated permits drills of different diameters to be associated with the device.

A conventional drill has been designated 62, and includes an elongated main body embraced by the clamping ring sections. Constituting a part of the drill is a barrel 64, disposed laterally of the main body of said drill, and supplied with air under pressure through the medium of a supply hose 66. An extensible drilling bit 68 projects upwardly from the barrel 64, and is adapted to penetrate the top wall or ceiling B of the rock or coal formation being drilled.

Secured to and extending downwardly from the lower end of the main body of the drill is a ground engaging point 70, that is adapted to be embedded in the bottom wall or floor A of said rock or coal formation. When the ground point 70 is engaged in the floor of the mine, it serves to support the dust collecting device above the floor surface, as may be readily noted from Figure 4. Thus, the drill is the support for the dust collecting device, the support 23 of said device serving to support the dust collecting head that constitutes a component part of the assembly.

Secured fixedly to the upper end of the tubular rod 22 is a sleeve 72, integral or otherwise rigid with a laterally projected support arm 74. A screw 75 threaded into the upper end of the tubular rod serves to cap the rod, and also serves to retain the sleeve 72 in position upon the upper end of the rod.

The other end of the support arm 74 is rigid with one end portion of a U-shaped support bar 78, having transversely aligned openings at opposite ends thereof, receiving bolts 80, that extend into the outer ends of oppositely extended, tubular projections 82 formed upon the opposite sides of a dust collecting head casing generally designated 84.

Since the rod 22 is, of course, rotatable within the tubular piston 16, the dust collecting head is mounted to swing about the longitudinal center line of the rod 22, so as to be swiveled upon the upper end of the support 23, for movement in an arcuate path in a plane perpendicular to the longitudinal axis of said support. Further, through the provision of the particular connection between the arcuate bar 78, and the projections 82, the dust collecting head casing is mounted for pivotal movement about an axis normal to the axis on which the dust collecting head is swiveled upon the support 23.

This arrangement permits the dust collecting head to be swung to desired positions where drilling operations are to be performed in the surface B, and further, permits the dust collecting head to be tilted into correspondence with the angle of inclination of said surface.

Considering the formation of the casing 84, this includes an upstanding cylindrical portion 86, the upper end of which is embraced by an outer clamping band 88. The outer clamping band 88 cooperates with an inner clamping band 90 (see Figure 6), said clamping bands being rigidly connected to one another and to the cylindrical portion 86 by means of fastening elements 92 extending therethrough. The fastening elements 92, in this connection, also extend through a soft rubber sealing ring 94 of annular formation, having a peripheral groove in its under side receiving the top edge of the cylindrical portion, and secured tightly to said cylindrical portion by means of the outer and inner bands.

It will be seen that when the dust collecting head is pressed upwardly against the surface B, the soft rubber sealing ring 94 will conform substantially to the configuration of said top surface, so as to substantially seal the dust collecting head against the admission of air from outside the casing 84.

Integrally formed upon the casing 84 is a tapered, angular, hollow extension 96, in the under side of which is formed an opening 98. Soft rubber sealing plates 100 respectively overlie and underlie the wall of the tapered extension 96 in which the opening 98 is formed, and have registering apertures 102 concentric with the opening 98, but formed to a substantially smaller diameter than the diameter of said opening. The soft rubber sealing plates 100 are utilized, to permit the insertion of the shank of the drill bit 68 through the wall of the dust collecting head casing, and permit the manipulation of the drill bit shank relative to the dust collecting head while still preserving a sealing effect at the location where the shank of the drilling bit enters the head casing.

For the purpose of retaining the sealing plates 100 in proper position, I provide a series of bolts 104 spaced circumferentially of said sealing plates, and passing through the sealing plates and through annular clamping rings 106 overlying and underlying said plates. The bolts 104 also pass through a circumferential series of openings formed in the wall of the dust collecting head casing 96, and thus tightly secure the peripheral portion of the soft, resilient sealing plates to the head casing.

Extending into the dust collecting head is a supply tube 108, the portion of said supply tube disposed within the head being extended downwardly as at 110 and being formed with a flat, wide outlet nozzle 112, which is adapted to spread air laterally within the dust collecting head, when said air is forced through the tube 108.

A branch tube 114 extends from that portion of the supply tube 108 disposed exteriorly of the head casing, and is also extended into the head casing. The branch tube 114, as may be noted from Figure 5, is of arcuate formation, and extends for a substantial part of the circumference of the cylindrical portion 86, within the dust collecting head. The branch tube 114 is provided (Figure 5) with a longitudinal series of perforations 116, through which air is forced under substantial pressure into the dust collecting head, said air being forced radially and inwardly of said head.

The air forced through the perforations 116 is adapted to cooperate with the air forced through the flared, flattened nozzle 112, so that through the entire inner area of the dust collecting head, there is a downwardly moving, turbulent mass of air, that is adapted to stir the dust within the head, and carry the dust downwardly.

For the purpose of regulating the flow of air through the branch tube, I provide a control valve 118, which may be closed completely, or which may be opened to a selected extent.

Formed upon the lower end of the tapered extension 96 is a tubular conduit 120 having at its lower or outlet end a peripheral connecting flange 122.

In the connecting flange 122, I form (see Figure 5) diametrically opposite, arcuate slots 124 formed with enlargements 126 at one end thereof. The slots 124 are adapted to receive pins 128 upstanding from a flange 130, formed upon the upper end of a pipe member 132 carried by a collecting bag 134.

The construction described above is one that permits the flanges 122 and 130 to be separably but sealably connected to one another, it being understood that a suitable gasket would be employed between the respective flanges. In other words, by registering the enlargements 126 with the pins 128, said pins can move outwardly through the slots, to permit separation of the flanges. When, however, the flanges are to be connected, the headed pins 128 are positioned through the enlargements 126, after which the flange 130 is rotated partially relative to the flange 122, thereby to cause the pins 128 to move into the narrow portions of the slots and secure the flanges to one another in a manner to prevent leakage.

For the purpose of supplying air to the tube 108, a length of hose 136 is provided, that is connected at one end to said tube, and is connected at its other end to a coupling 138 provided upon the upper end of the rod 22. The coupling 138, in fact, extends from the sleeve 72, and it will be understood that the upper end of the rod 22 would be provided with an opening communicating with said coupling.

In the coupling 138, I provide a by-pass control valve 140, which is usable to close in the flow of air to the collecting head through the by-pass tube 38 in the closed main valve position.

In use, the dust collecting head is attached to a conventional drill 62, in the manner illustrated in Figure 4. The dust collecting head is then swiveled upon the upper end of the support 23, so as to register the apertures 102 with the drill bit. Air is then supplied under pressure through the hose 66 to the drill, and the same source which is used to supply said air would be used to supply air to the hose 46 of the dust collecting device.

As a result, the drill bit shank 68 is forced upwardly into the overhead surface B, and simultaneously the tubular piston 16 and rod 22 are forced upwardly, so as to cause the soft, resilient sealing ring 94 to be forced tightly against the overhead surface, regardless of the elevation or angle of inclination of said surface.

The drill bit shank 68 is then fed upwardly through the apertures 102, and is used in the regular manner to penetrate the rock or coal formation.

During the operation of the drill, the air used to maintain the dust collecting head against the surface being drilled is automatically forced into the dust collecting head, so as to carry into the dust collecting bag 134 the dust caused by the drilling operation.

It will be understood that the by-pass discussed hereinbefore can be selectively used in the proper circumstances, so as to permit the device to be moved from place to place without possibility of the dust bag 134 being accidentally squeezed to an extent as would cause the dust to be forced back out of the collecting head. In other words, even during movement of the device from place to place, air is being forced downwardly through the conduit 120, so as to retain the dust within the bag 134.

It may be further noted that air can be by-passed directly to the collecting head should the tubular support 23 be clogged. In other words, the lower end of a hose could be connected to the depending extension on the tube 38, with the upper end of said hose being connected to the hose 136 by means of coupling 138, after detachment of coupling 138 from the upper end of the rod 22.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. A dust collecting head for pneumatic drills comprising a cylindrical portion formed open at opposite ends; a resilient sealing ring mounted upon one end of said cylindrical portion and adapted to engage a surface to be drilled; an angular extension communicating with and extending from the other end of said cylindrical portion, said angular extension being formed with an opening in a wall thereof adapted to receive a drill bit shank; resilient sealing plates detachably mounted upon said wall and extending about said opening; said plates being apertured to receive a drill bit shank; a pair of air supply tubes extending into said cylindrical portion, said air supply tubes being effective to create a flow of air through the cylindrical portion and extension, to carry off dust received in said cylindrical portion during drilling operations; and means carried by said extension and proportioned as a receptacle for said dust.

2. A dust collecting head for pneumatic drills comprising a cylindrical portion formed open at its opposite ends; a sealing ring carried by one end of said cylindrical portion, said sealing ring being of resilient material and being adapted to engage a surface to be drilled; a pair of air supply tubes extending into said cylindrical portion, one of said supply tubes being extended longitudinally of the cylindrical portion, the other supply tube being of arcuate, foraminous formation and extending about the inner surface of said cylindrical portion at a location opposite the first tube; an angular extension communicating with the other end of said cylindrical portion, said angular extension having an opening formed in one wall thereof; a pair of spaced, resilient sealing plates mounted upon said wall and extending about the opening, said plates being apertured to receive a drill bit; and means carried by said angular extension and constituting a receptacle for dust forced through the cylindrical portion and angular extension responsive to the supplying of air under pressure through said tubes.

BLAINE R. BRINKLEY.

References Cited in the file of this patent

UNITED STATES PATENTS

| Number | Name | Date |
|---|---|---|
| 1,128,675 | Galligan | Feb. 16, 1915 |
| 1,664,786 | Mumavich | Apr. 3, 1928 |
| 1,930,099 | Kelley | Oct. 10, 1933 |
| 2,041,689 | Baumeister et al. | May 26, 1936 |
| 2,279,186 | Terry et al. | Apr. 7, 1942 |
| 2,327,497 | Burch et al. | Aug. 24, 1943 |